United States Patent [19]

Peter et al.

[11] 3,849,696

[45] Nov. 19, 1974

[54] VERTICAL CONVERGENCE CIRCUITS

[75] Inventors: Rene Peter, Basel; Hans Peter Lambrich, Geroldswil, both of Switzerland

[73] Assignee: RCA Corporation, New York, N.Y.

[22] Filed: Jan. 6, 1972

[21] Appl. No.: 215,864

[30] Foreign Application Priority Data

Jan. 6, 1971 Great Britain ........................ 569/71

[52] U.S. Cl. ........ 315/13 C, 315/13 CG, 315/27 TD
[51] Int. Cl. .............................................. H01j 29/50
[58] Field of Search ........ 315/13 C, 13 CG, 27 XY, 315/27 TD

[56] References Cited

UNITED STATES PATENTS

| | | | |
|---|---|---|---|
| 3,375,398 | 3/1968 | Ohlhorst | 315/13 C |
| 3,519,875 | 7/1970 | Brockmann | 315/13 C |
| 3,098,170 | 7/1963 | Rhodes | 315/13 CG |
| 3,187,218 | 6/1965 | E'Del | 315/13 C X |
| 3,531,682 | 9/1970 | Jarosz | 315/13 C |

*Primary Examiner*—Leland A. Sebastian
*Assistant Examiner*—P. A. Nelson
*Attorney, Agent, or Firm*—Eugene M. Whitacre

[57] ABSTRACT

In a color television receiver, including a transformerless vertical deflection circuit for providing vertical rate drive signals to an associated vertical deflection yoke, a vertical convergence circuit is coupled between first and second terminals in parallel with a low impedance vertical deflection yoke. Red and green convergence windings are connected substantially in parallel by means of top and bottom differential control potentiometers. Opposite ends of each winding are returned to the second input terminal by means of oppositely poled diodes. Drive waveforms are supplied from the first terminal via a further pair of oppositely poled diodes. Each of the latter diodes is coupled via a master amplitude potentiometer to one of the differential potentiometers. One of the latter diodes is poled to conduct during a first half of vertical scan while the other is poled to conduct during the second half of vertical scan. Substantially independent adjustment of top and bottom vertical convergence is provided. A blue convergence winding coupled in a reactive bridge arrangement is also coupled via oppositely poled diodes in parallel with the yoke. Substantially independent adjustment of top and bottom vertical convergence is provided.

Additional diodes are coupled across the red and green windings to reduce the effect of retrace pulses when they are objectionable.

14 Claims, 3 Drawing Figures

VERTICAL CONVERGENCE CIRCUITS

The present invention relates generally to dynamic convergence circuits for a multibeam color kinescope and, particularly, to vertical or field rate convergence circuits.

In color television receivers employing a multibeam kinescope, such as the widely used three gun, shadow mask kinescope, it is customary to provide dynamic correction of beam misconvergence errors. The necessary correction is realized by energizing electromagnetic devices with signals which vary at both line (horizontal) and field (vertical) scanning rates so as to alter appropriately the paths of the beams. A widely used type of beam path altering structure includes individual electromagnets associated with corresponding pole pieces internal to the kinescope, each electromagnet being associated with one of the beams and each including separate windings for energization at the vertical and horizontal scanning rates.

The present invention is directed to convergence circuitry especially suited for developing and controlling currents in the vertical convergence windings of the convergence electromagnets. In the conventional convergence structure associated with a delta beam kinescope, the shifts in beam landing which are produced when the electromagnets associated with the red and green beams are energized are diagnoal (including both vertical and horizontal movement), while the shift in beam landing introduced by energization of the blue convergence winding is vertical only. Furthermore, the diagonal axes along which the red and green beam displacements occur are crossed. As a consequence, changes of a similar sense in red and green convergence currents introduce opposing horizontal shifts of the red and green beams accompanied by a shift of both beams in a common vertical direction. Mutually opposed changes in red and green convergence currents introduce opposing vertical shifts of the red and green beams accompanied by a shift of both beams in a common horizontal direction.

As a practical matter, it is necessary that the dynamic convergence circuitry incorporate several variable controls. These controls should permit a sufficient range of adjustment of the convergence currents so that beam landing corrections appropriate for the misconvergence errors encountered with various combinations of receiver components can be produced. By interrelating the energization of the red and green convergence windings, such that both master amplitude and differential control of their currents can be effected, the matching of red and green beam landing points can be separated into convenient horizontal line and vertical line alignment adjustments. Convergence adjustments can then be completed by appropriate adjustment of the blue convergence current to provide the remaining horizontal line alignment.

In many of the misconvergence patterns that require correction, the misconvergence at the top of the picture does not match the misconvergence at the bottom of the picture. A practical convergence adjustment arrangement must take this condition into account by providing some facility for altering the magnitude of the end (bottom) of scan energizing waveform relative to the magnitude of the beginning (top) of scan energizing waveform. A difficulty encountered in many prior art circuit arrangements is that a control provided to solve this problem by adjusting, for example, the end of scan magnitude relative to the beginning of scan magnitude (set by another control) tends to disturb the beginning of scan magnitude, thereby requiring readjustment of the other control.

U.S. Pat. No. 3,491,261, issued on Jan. 20, 1970 to Michael W. Hill and Lawrence E. Smith, discloses vertical rate convergence circuitry including provisions for substantially confining the effect of each control to a particular half of the scan interval. Modifications of the Hill et al. type of circuitry, for ensuring a greater degree of avoidance of interaction of the controls, are described in U.S. Pat. Application Ser. No. 143,861, filed May 17, 1971 in the name of Michael W. Hill, which application is based upon British Provisional Applications Ser. No. 23,940/70 and 24,941/70, both filed in the United Kingdom on May 18, 1970.

The present invention is directed to additional arrangements wherein interaction between the various controls is avoided. A further feature of the present invention is that the source of drive signals for the entire vertical convergence circuitry may be derived from two terminals associated with the vertical deflection circuit without the interposition of any transformer. This is in contrast with many prior art circuits that require several different sources of drive signals. A typical approach of the latter type utilizes either several windings on a vertical output transformer or the combination of such windings with a filter circuit associated with the main current path of the vertical output device (e.g., a tube or transistor) to provide the several different drive waveforms. The present invention, like the arrangements described in the above-mentioned patent and application, therefore permits avoidance of the use of complicated and costly transformer windings as the source of convergence waveforms.

In addition, the present invention is particularly adapted for use in connection with low impedance (e.g., in the approximate range of one to five ohms) vertical deflection yokes. Such are currently wound in toroidal fashion and are suitable for use with transformerless, solid state vertical output circuits. The described convergence circuitry is suitable for connection in parallel with such a low impedance yoke in a direct drive transistor output circuit. If the convergence circuitry were coupled in series with a low impedance yoke in such a circuit, the vertical output stage would be required to provide substantially higher power output. The increased power output could be provided by additional active devices. However, such an approach is usually undesirable from an economic standpoint. The parallel coupled convergence arrangement described herein advantageously consumes relatively low power without the need for either additional active devices or transformer coupling.

In accordance with an embodiment of the present invention, a convergence circuit is connected between first and second input terminals which are adapted for connection to (e.g., across the yoke in) a vertical deflection circuit. A first unidirectionally conductive circuit including a first variable resistance is coupled between the terminals for supplying current through at least one convergence winding during one-half of each vertical scan interval. A second unidirectionally conductive circuit including a second variable resistance is coupled between the terminals for supplying current through the convergence winding during a complementary half of each vertical scan interval. During the complementary half of scan, current is blocked in the first circuit while, during the first-mentioned half of scan, current is blocked in the second circuit. The unidirectionally conductive apparatus acts to isolate the respective curent paths such that adjustment of the variable resistances produces a change in only one path but not in the other. Independent top and bottom convergence controls are thereby provided.

In accordance with a further aspect of the invention, a second convergence winding is coupled across the first by means of two variable resistance means, the latter providing differential control of currents through the two (e.g., red and green) convergence windings. Additional appropriately poled unidirectionally conductive devices are coupled to the second winding.

In a preferred embodiment of the invention, the convergence circuitry is coupled in parallel with the vertical deflection yoke.

Other advantages of the present invention, together with a better understanding thereof, will be apparent to those skilled in the art upon a reading of the following detailed description in conjunction with the accompanying drawings in which.

Figure 1:
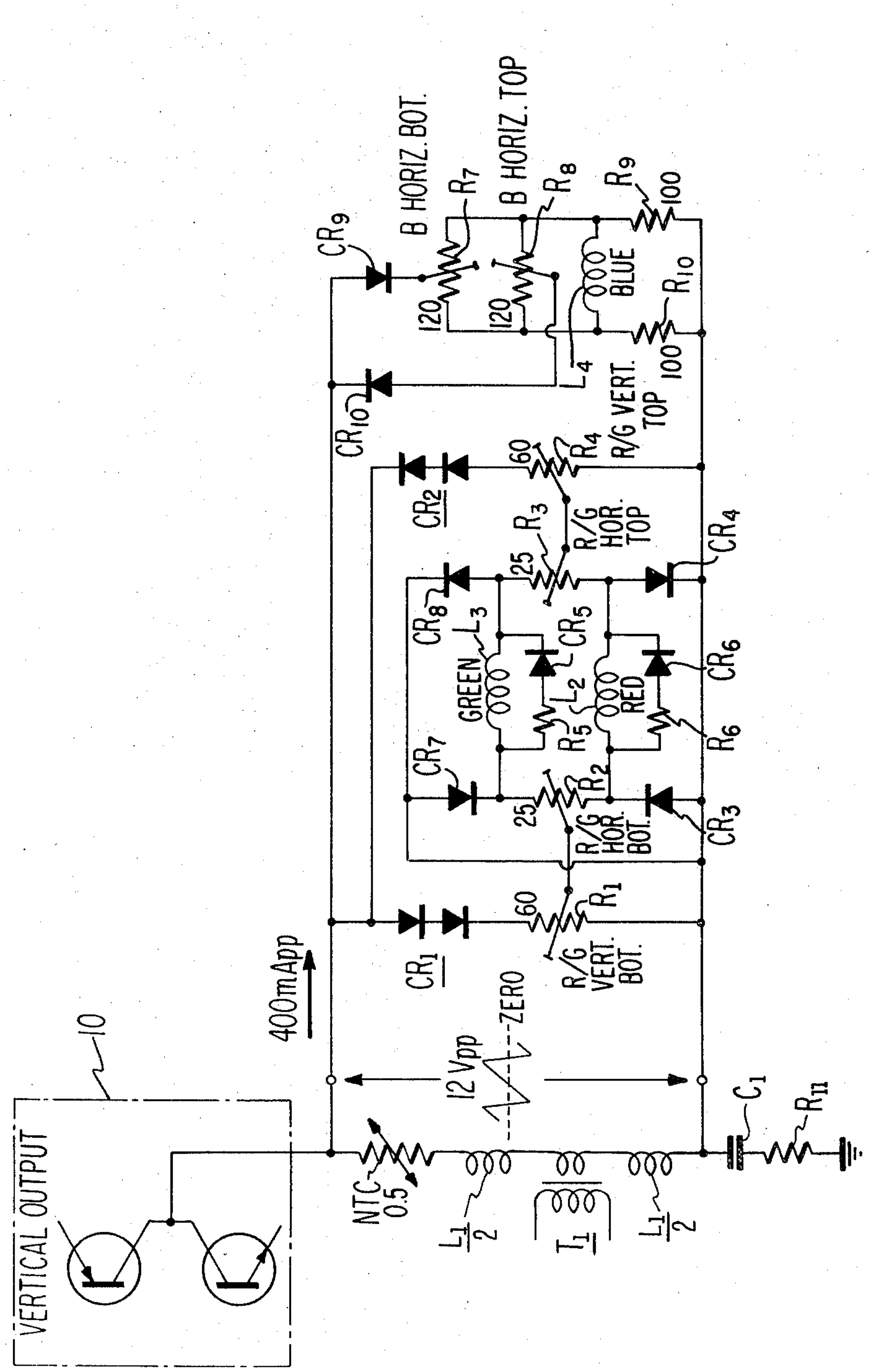
FIG. 1 illustrates schematically a portion of a color television receiver including vertical convergence circuitry constructed in accordance with the present invention.

Referring to the drawing, in FIG. 1, a transformerless vertical deflection output amplifier 10 is coupled to a relatively low impedance vertical deflection yoke $L_1$. The output amplifier 10 is illustrated as including two opposite conductivity transistors, the yoke $L_1$ being coupled to the joined collectors of the transistors. As is well known, several different versions of transformerless output amplifiers may be employed for vertical deflection. For example, in addition to that illustrated, quasi-complementary symmetry amplifiers and complementary symmetry amplifiers having emitter outputs may also be used.

The windings of yoke $L_1$ are separated into two equal portions ($L_1/2$) and a pincushion correction transformer $T_1$ is coupled between the halves of yoke $L_1$. A temperature compensating thermistor NTC, having a negative temperature coefficient, is also preferably coupled in series with the yoke $L_1$. A relatively large S-correction capacitor $C_1$ and a current sampling resistor $R_{11}$ complete the return path to reference potential (e.g., ground) for the current in yoke $L_1$. As is customary in transformerless vertical deflection circuits, appropriate feedback (not shown) is provided for amplifier 10 from across each of capacitor $C_1$ and resistor $R_{11}$.

Typically, where the yoke $L_1$ is toroidally wound, it may have an impedance in the range of 1 to 5 ohms. A representative value for presently available toroidal yokes is 1.5 ohms. In the normal operation of the deflection circuit of FIG. 1, an essentially sawtooth voltage waveform, as is shown adjacent yoke $L_1$ in FIG. 1, appears across yoke $L_1$. The sawtooth voltage recurs at the vertical deflection rate (e.g., approximately 60 Hertz under standards employed in the United States). The substantially sawtooth voltage waveform is utilized to energize the vertical convergence circuit coupled in parallel with the yoke $L_1$.

The vertical convergence circuit comprises a red convergence winding $L_2$ and a green convergence winding $L_3$. A first unidirectionally conductive current path comprising a pair of series connected diodes $CR_1$, a red-green, vertical, bottom potentiometer $R_1$, a red-green, horizontal, bottom potentiometer $R_2$, winding $L_2$ and a diode $CR_4$, poled in the same direction as diodes $CR_1$, is coupled in parallel with the yoke $L_1$.

A second, oppositely poled, unidirectionally conductive current path comprising diodes $CR_2$, red-green, vertical, top potentiometer $R_4$, red-green, horizontal, top potentiometer $R_3$, winding $L_2$ and diode $CR_3$, poled in the same direction as diodes $CR_2$, is also coupled in parallel with the yoke $L_1$.

The adjustable taps of potentiometers $R_4$ and $R_1$ (the top and bottom master amplitude potentiometers) are connected, respectively, to the adjustable taps of potentiometers $R_3$ and $R_2$ (the top and bottom differential potentiometers). Green convergence winding $L_3$ is connected between the ends of potentiometers $R_2$ and $R_3$ remote from red convergence winding $L_2$. The ends of green winding $L_3$ are returned to the lower end of yoke $L_1$ by means of diodes $CR_8$ and $CR_7$ which are poled to conduct, respectively, when diodes $CR_1$ and $CR_2$ conduct. Additional diodes $CR_5$ and $CR_6$, and associated current limiting resistors $R_5$ and $R_6$, are coupled across winding $L_3$ and $L_2$, respectively. Diodes $CR_5$ and $CR_6$ are also poled to conduct when diodes $CR_2$ conduct.

A blue convergence winding $L_4$ is also supplied with an energizing waveform provided across yoke $L_1$. Opposite ends of blue winding $L_4$ are returned to the lower end of yoke $L_1$ by means of resistors $R_9$ and $R_{10}$. A blue, horizontal, bottom potentiometer $R_7$ and a blue, horizontal, top potentiometer $R_8$ are coupled across blue winding $L_4$. The adjustable taps of potentiometers $R_7$ and $R_8$ are supplied with energizing current via oppositely poled diodes $CR_9$ and $CR_{10}$ which are coupled to the upper end of yoke $L_1$.

The operation of the circuit of FIG. 1 will be explained in part below referring to the simplified schematic diagram of FIG. 2 in which only the red convergence winding $L_2$ is included. In addition, the resistor NTC and pincushion transformer $T_1$ have been omitted. The same reference characters have been employed in FIGS. 1 and 2 for the various circuit elements.

Figure 2:
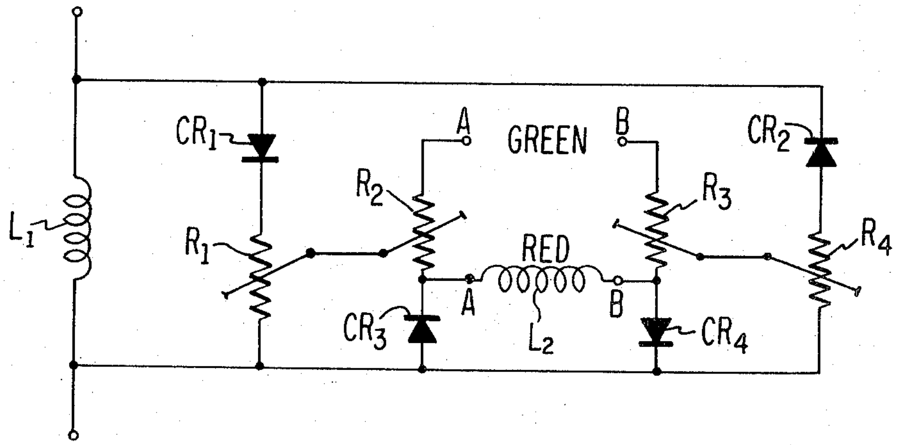
FIG. 2 illustrates schematically a portion of the circuit of FIG. 1 which has been simplified for purposes of explanation.

In FIG. 2, the yoke $L_1$ is illustrated as a single winding. Furthermore, diodes $CR_1$ and $CR_2$ are shown as single junction devices.

Figure 3:
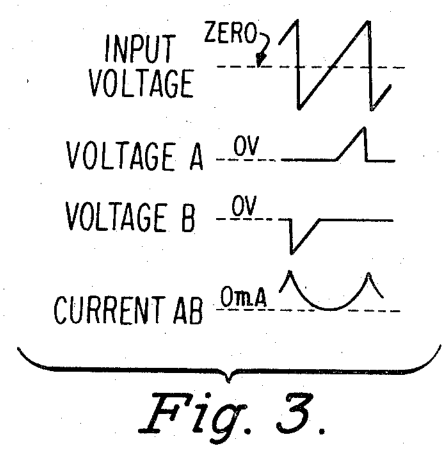
FIG. 3 illustrates series of simplified voltage and current waveform diagrams which relate to the circuit of FIG. 2.

In operation, the voltage across the yoke $L_1$ (see uppermost waveform in FIG. 3) changes relatively rapidly from a positive to a negative peak during the vertical retrace portion of each vertical deflection cycle. The slower, substantially linear change from negative peak to positive peak occurs during the vertical scan or trace interval. Throughout the first half of vertical scan, which corresponds to the upper half of the television image, the voltage across yoke $L_1$ is negative. That polarity is suitable for forward biasing the current path including diode $CR_2$, potentiometer $R_4$, potentiometer $R_3$, red winding $L_1$ and diode $CR_3$. The voltage at point B (see waveforms - FIG. 3) is therefore a half-sawtooth of negative polarity during the first half of vertical scan. Diodes $CR_1$ and $CR_4$ are reverse biased at this time. Potentiometers $R_1$ and $R_2$ are bypassed by virtue of the forward conduction condition of diode $CR_3$. Adjustment of potentiometer $R_4$ controls the magnitude of the voltage available at point B and therefore serves as a master amplitude control for the top of the picture for red correction (and for green as well in the FIG. 1 circuit).

The current through red winding $L_2$ will flow, for example, from terminal A to terminal B during the first half of scan (see FIG. 3) but, because of the inductive nature of winding $L_2$, the applied sawtooth voltage will be effectively integrated to produce the illustrated parabolically declining current.

During the second half of the vertical trace interval, diodes $CR_2$ and $CR_3$ are reverse biased by the applied voltage waveform (which is now positive). Diodes $CR_1$ and $CR_4$ conduct in response to this latter polarity of applied waveform such that a parabolically increasing current flows from terminal A to terminal B through red winding $L_2$. Resistor $R_1$ thus serves as a bottom master amplitude control for the vertical convergence circuitry. Diode $CR_4$ bypasses potentiometers $R_3$ and $R_4$ during this second half of vertical scan. Substantially independent adjustment of top and bottom correction waveform amplitudes can thus be obtained.

In the complete circuit of FIG. 1, the green convergence winding $L_3$ is also included together with diodes $CR_7$ and $CR_8$ which perform functions analogous to those described above in connection with diodes $CR_3$ and $CR_4$, respectively. The potentiometers $R_2$ and $R_3$ control the division of current as between red winding $L_2$ and green winding $L_3$. Thus, a change in the setting of red-green bottom master amplitude control $R_1$ produces like changes in the currents supplied to red and green winding $L_2$ and $L_3$ during the second half of scan (bottom of picture). However, changes in the setting of $R_2$ produce differential or opposite changes in current in windings $L_2$ and $L_3$. This provides the desirable control feature whereby potentiometer $R_1$ is adjusted to converge vertical red and green lines in the bottom half of the screen, whereas potentiometer $R_2$ is adjusted to converge horizontal red and green lines in the bottom half of the screen.

Potentiometers $R_3$ and $R_4$ provide analogous adjustments for lines at the top of the picture.

In practice, it has been found to be advantageous to employ two diodes for each of the devices $CR_1$ and $CR_2$. This arrangement produces a desired steepness of the parabolic current waveform at the beginning and end of scan Blue convergence is provided by means of the arrangement of diodes $CR_9$, $CR_{10}$, potentiometers $R_7$ and $R_8$, resistors $R_9$ and $R_{10}$ and blue winding $L_4$. The diodes $CR_{10}$ and $CR_9$ conduct alternately during the first half and second half, respectively, of each vertical scan interval. Blue coil $L_4$ is connected in a bridge circuit with resistors $R_9$, $R_{10}$ and the potentiometers $R_7$ and $R_8$. Convergence current through blue winding $L_4$ may therefore be adjusted by means of potentiometers $R_7$ and $R_8$ so as to flow in either direction during each half of vertical scan.

In the description above, it was assumed, for purposes of explanation, that the voltage across the yoke $L_1$ is a regular sawtooth with equal positive and negative peaks. In fact, the yoke $L_1$ exhibits the characteristics of the series combination of a resistance and an inductance. The voltage across the yoke $L_1$ therefore includes a negative-going pulse component during vertical retrace. The ratio of the pulse amplitude to the sawtooth amplitude depends upon the inductance to resistance relationship of the yoke $L_1$. Toroidal vertical yokes which are presently available have a low inductance to resistance ratio and therefore the pulse amplitude during retrace is sufficiently small that it may be neglected.

However, if larger pulse amplitudes are encountered, as for example where higher inductance to resistance ratio yokes are used, additional diodes $CR_5$ and $CR_6$ are coupled in parallel with windings $L_3$ and $L_2$. To avoid excessive current flow through diodes $CR_5$ and $CR_6$, resistors $R_5$ and $R_6$ are coupled in series with such diodes. The diodes $CR_5$ and $CR_6$ serve to bypass the windings $L_3$ and $L_2$ during the occurrence of the higher frequency, negative-going retrace pulses, thereby reducing possible distortion of the convergence waveforms at the top of the picture.

While the invention has been described in terms of a preferred embodiment, various additional modifications may be made to the circuit within the scope of the invention.

An illustrative set of component values with which the invention may be employed is included in FIG. 1. The designated values are satisfactory for use with a yoke having an impedance of 1.5 ohms. In addition, the convergence windings $L_2$, $L_3$ and $L_4$ each may have an inductance of 28 millihenries. Suitable diodes are the type 1N914.

If resistors $R_5$ and $R_6$ are employed, suitable values are 33 ohms for each resistor.

Typical operating current and voltage levels are also indicated on FIG. 1.

What is claimed is:

1. In a color television receiver, including a vertical deflection circuit for providing vertical rate drive signals to an associated vertical deflection yoke, a convergence circuit comprising:

first and second input terminals adapted for connection to said deflection circuit, magnetic field producing means including at least a first convergence winding, and first and second current paths between said terminals, said current paths comprising, respectively, a series combination of a first unidirectionally conductive means with a first variable resistance means and a second unidirectionally conductive means with a second variable resistance means, said first conductive means being poled and connected for conducting current through said winding while bypassing said second current path so as to isolate said first current path from variations of said second resistance means during a given half of each vertical scan interval and for blocking current flow through said first variable resistance means during a complementary half of each vertical scan interval, said second conductive means being poled and connected for conducting current through said winding while by-passing said first current path so as to isolate said second current path from variations of said first variable resistance means during said complementary half of each vertical scan interval and for blocking current flow through said second variable resistance means during said given half of each vertical scan interval.

2. A convergence circuit according to claim 1 wherein:

said first unidirectionally conductive means comprises first and second diodes poled similarly in said first current path, said first diode being coupled between said first terminal and a first end of said winding, said second diode being coupled between a second end of said winding and said second terminal, and said second unidirectionally conductive means comprises third and fourth diodes poled similarly in said second current path, said third diode being coupled between said first terminal and said second end of said winding, said fourth diode being coupled between said first end of said winding and said second terminal.

3. A convergence circuit according to claim 1 wherein:

said magnetic field producing means further includes at least a second convergence winding, third variable resistance means coupling a first end of said first winding to a first end of said second winding, and fourth variable resistance means coupling a second end of said first winding to a second end of said second winding, said third and fourth variable resistance means adapted to selectively split said currents in said first and second current paths, respectively, between said first and second windings.

4. A convergence circuit according to claim 3 wherein:

said first unidirectionally conductive means comprises first and second diodes poled similarly in said first current path, said first diode being coupled between said first terminal and said first end of each of said windings, said second diode being coupled between said second end of said first winding and said second terminal, and said second unidirectionally conductive means comprises third and fourth diodes poled similarly in said second current path, said third diode being coupled between said first terminal and said second ends of said windings, said fourth diode being coupled between said first end of said first winding and said second terminal.

5. In a color television receiver, including a vertical deflection circuit for providing vertical rate drive signals to an associated vertical deflection yoke, a convergence circuit comprising:

first and second input terminals adapted for connection to said deflection circuit, magnetic field producing means including at least first and second convergence windings, and first and second current paths between said terminals, said current paths comprising, respectively, a series combination of a first unidirectionally conductive means with a first variable resistance means and a second unidirectionally conductive means with a second variable resistance means, said first conductive means being poled and connected for conducting current through said first winding while bypassing said second current path so as to isolate said first current path from variations of said second resistance means during a given half of each vertical scan interval and for blocking current flow through said first variable resistance means during a complementary half of each vertical scan interval, said first unidirectionally conductive means comprises first and second diodes poled similarly in said first current path, said first diode being coupled between said first terminal and said first end of each of said windings, said second diode being coupled between said second end of said first winding and said second terminal, and said second conductive means being poled and connected for conducting current through said first winding while bypassing said first current path so as to isolate said second current path from variations of said first variable resistance means during said complementary half of each vertical scan interval and for blocking current flow through said second variable resistance means during said given half of each vertical scan interval, said second unidirectionally conductive means comprises third and fourth diodes poled similarly in said second current path, said third diode being coupled between said first terminal and said second ends of said windings, said fourth diode being coupled between said first end of said first winding and said second terminal, third variable resistance means coupling a first end of said first winding to a first end of said second winding, fourth variable resistance means coupling a second end of said first winding to a second end of said second winding, said third and fourth variable resistance means adapted to selectively split currents in said first and second current paths, respectively, between said first and second windings, a fifth diode coupled between said second end of said second winding and said second terminal and poled to conduct current supplied via said first diode, and a sixth diode coupled between said first end of said second winding and said second terminal and poled to conduct current supplied via said third diode.

6. A convergence circuit according to claim 5 wherein:

each of said variable resistance means comprises a potentiometer having a pair of end terminals and an adjustable tap, the tap of said first potentiometer being coupled to the tap of said third potentiometer and the tap of said second potentiometer being coupled to the tap of said fourth potentiometer.

7. A convergence circuit according to claim 6 wherein:

said first and second input terminals are adapted for connection across said vertical deflection yoke.

8. A convergence circuit according to claim 7 and further comprising:

seventh and eighth diodes coupled, respectively, across said first and second convergence windings and poled to conduct during portions of the vertical retrace interval.

9. In a color television receiver, including a vertical deflection circuit for providing vertical rate drive signals to an associated vertical deflection yoke, a convergence circuit comprising:

first and second input terminals adapted for connection to said deflection circuit, magnetic field producing means including at least a first convergence winding, and first and second current paths between said terminals, said current paths comprising, respectively, a series combination of a first unidirectionally conductive means with a first potentiometer and a second unidirectionally conductive means with a second potentiometer, each of said potentiometers having a variable tap, one end coupled to one of said input terminals, a second end coupled to an associated one of said unidirectionally conductive means, means including a third unidirectionally conductive means for coupling said winding between said tap and said one end of said first potentiometer, means including a fourth unidirectionally conductive means for coupling said winding between said tap and said one end of said second potentiometer, said first and third unidirectionally conductive means being similarly poled for conducting current through said winding while bypassing said second current path during a given half of each vertical scan interval and for blocking current flow through a portion of said first potentiometer between said first conductive means and said tap during a complementary half of each vertical scan interval, said second and fourth unidirectionally conductive means being similarly poled for conducting current through said winding while bypassing said first current path during said complementary half of each vertical scan interval and for blocking current flow through a portion of said second potentiometer between said second means and said tap during said given half of each vertical scan interval.

10. A convergence circuit according to claim 9 wherein:

said first and second input terminals are coupled across said deflection yoke, said first and third unidirectionally conductive means comprise first and third diodes poled similarly in said first current path, said first diode being coupled between said first terminal and a first end of said winding, said third diode being coupled between a second end of said winding and said second terminal, and said second and fourth unidirectionally conductive means comprise second and fourth diodes poled similarly in said second current path, said second diode being coupled between said first terminal and said second end of said winding, said fourth diode being coupled between said first end of said winding and said second terminal.

11. A convergence circuit according to claim 10 wherein:

said magnetic field producing means further includes at least a second convergence winding, a third potentiometer coupled between a first end of said first winding and a first end of said second winding, and a fourth potentiometer coupled between a second end of said first winding and a second end of said second winding, said third and fourth potentiometers adapted to selectively split said currents in said first and second current paths, respectively, between said first and second windings.

12. In a color television receiver, including a vertical deflection circuit for providing vertical rate drive signals to an associated vertical deflection yoke, a convergence circuit comprising:

first and second input terminals coupled across said deflection yoke, magnetic field producing means including at least first and second convergence windings, first and second current paths between said terminals, said current paths comprising, respectively, a series combination of a first unidirectionally conductive means with a first potentiometer and a second unidirectionally conductive means with a second potentiometer, each of said potentiometers having a variable tap, one end coupled to one of said input terminals, a second end coupled to an associated one of said unidirectionally conductive means, means including a third unidirectionally conductive means for coupling said first winding between said tap and said one end of said first potentiometer, means including a fourth unidirectionally conductive means for coupling said first winding between said tap and said one end of said second potentiometer, said first and third unidirectionally conductive means being similarly poled for conducting current through said first winding while bypassing said second current path during a given half of each vertical scan interval and for blocking current flow through a portion of said first potentiometer between said first conductive means and said tap during a complementary half of each vertical scan interval, said second and fourth unidirectionally conductive means being similarly poled for conducting current through said first winding while bypassing said first current path during said complementary half of each vertical scan interval and for blocking current flow through a portion of said second potentiometer between said second means and said tap during said given half of each vertical scan interval, said first and third unidirectionally conductive means comprise first and third diodes poled similarly in said first current path, said first diode being coupled between said first terminal and a first end of said first winding, said third diode being coupled between a second end of said first winding and said second terminal, said second and fourth unidirectionally conductive means comprise second and fourth diodes poled similarly in said second current path, said second diode being coupled between said first terminal and said second end of said first winding, said fourth diode being coupled between said first end of said first winding and said second terminal, a third potentiometer coupled between a first end of said first winding and a first end of said second winding, a fourth potentiometer coupled between a second end of said first winding and a second end of said second winding, said third and fourth potentiometers adapted to selectively split currents in said first and second current paths, respectively, between said first and second windings, and fifth and sixth diodes coupled, respectively, across said first and second convergence windings and poled to conduct during portions of the vertical retrace interval.

13. A convergence circuit according to claim 12 wherein:

said fifth and sixth diodes are poled to conduct during at least the second half of each vertical retrace interval and wherein first and second current limiting resistors are coupled in series, respectively, with said fifth and sixth diodes.

14. A convergence circuit according to claim 13 and further comprising:

a seventh diode coupled between said second end of said second winding and said second terminal and poled to conduct current supplied via said first diode, and an eighth diode coupled between said first end of said second winding and said second terminal and poled to conduct current supplied via said second diode.

* * * * *